July 22, 1958  P. J. KIRCHER  2,844,341
FOOD CHOPPER SUPPORT
Filed April 22, 1954

INVENTOR.
PAUL J. KIRCHER
BY
Lindsey and Prutzman
ATTORNEYS

United States Patent Office 2,844,341
Patented July 22, 1958

2,844,341

FOOD CHOPPER SUPPORT

Paul J. Kircher, Plainville, Conn., assignor to Landers, Frary & Clark, New Britain, Conn., a corporation of Connecticut Application April 22, 1954, Serial No. 424,807

3 Claims. (Cl. 248—1)

The present invention relates to food choppers, and more particularly to an improved food chopper base of novel construction arranged to derive improved support on a table or counter top or the like without the need for clamps or similar fastening devices.

The present invention has particular utility with food choppers of the normal household variety which are operated by a hand crank. With such choppers, turning of the crank during operation develops large forces on the chopper which continually vary in direction and have a decided tendency to tilt or tip the chopper, or unseat it completely from the supporting surface on which it rests. The resulting unsteadiness has heretofore been overcome by providing a clamp of the screw or vise type for securely fastening the chopper to the overhang of a table top or counter top.

Such overhangs are often not available in modern kitchens, however, and thus use of choppers requiring such clamps is often troublesome and inconvenient. Moreover, the clamping operation wastes time and effort, and is likely to scar or mar the supporting surface.

It is the principal object of the present invention, therefore, to provide an improved food chopper base of novel and economical construction particularly adapted for use without clamps of any kind, and especially arranged to derive improved support from a table or counter top without need for overhang.

Another object is to provide an improved food chopper base of the character described having an improved supporting arrangement which can be optionally employed, and can be folded into a retracted non-obstructing position, out of sight, when not in use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
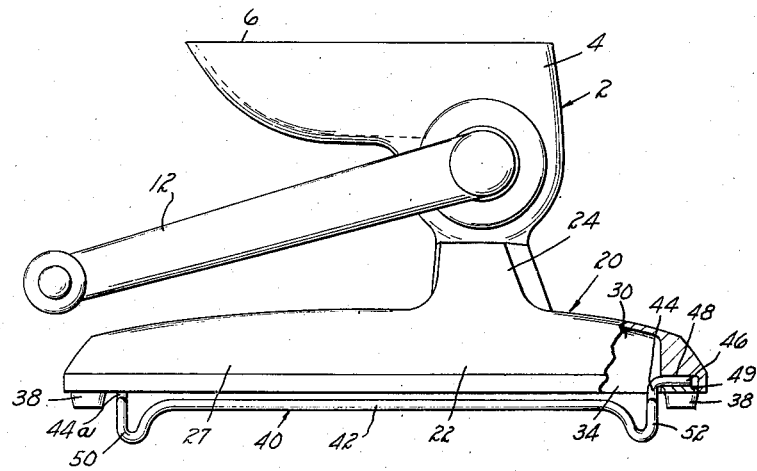
Figure 1 is an elevational view of a food chopper having a base constructed in accordance with the present invention.
Figure 2:
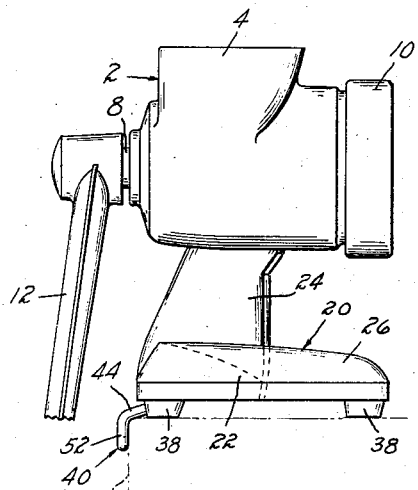
Figure 2 is a side view of the structure shown in Figure 1.

Referring to the drawings, a preferred embodiment of a food chopper constructed in accordance with the present invention includes a housing 2 provided with a food receiving hopper 4. The hopper 4 preferably is elongated or enlarged at one side to form an extending or overhanging lip portion 6. Rotatably supported in the housing is a shaft 8 which carries the usual feed screw (not shown) and carries at one end the usual rotatable cutter retained in assembly on the shaft by the collar 10. At the other or front end of the shaft is secured the usual hand crank 12 for manually rotating the feed screw and cutter when operating the chopper.

The housing is mounted on a pedestal indicated generally at 20 and may be made integral therewith if desired.

The pedestal includes an elongated base 22 longitudinally extending at right angles to the axis of rotation of crank 12. The base has an integral upstanding neck 24 which is positioned closer to one end of the base than the other, so that the base extends transversely farther on one side of the neck than the other. The transversely extending portion 6 of hopper 4 overhangs the longer portion 27 of the base thus formed.

At the ends of the base, and preferably integral therewith, are legs 26 which extend longitudinally or parallel to the axis of shaft 8 and are adapted to rest on a work surface such as a counter or table top and provide stability for the pedestal against tilting or tipping about a transverse axis. The legs 26 and base 22 are formed with a somewhat hollowed out or concave bottom side providing a recess 30 having a transverse central portion 32 within base 22 and longitudinally extending end portions 34 in legs 26. Secured to the bottoms of the legs by screws 36 or the like are feet 38 of resilient material, preferably having a high coefficient of friction, such as rubber, which afford good resistance to slipping or skidding of the pedestal on its work surface and prevent marring of the surface. The feet 38 also serve to space the legs 26 and base 22 slightly from the table or counter top, the clearance space thus provided together with recess 30 forming an enlarged cavity on the bottom side of the pedestal.

Figure 3:
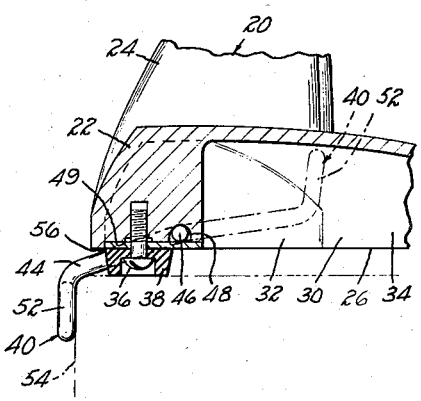
Figure 3 is a detailed partly sectionalized view of a portion of the structure shown in Figure 2.
Figure 4:
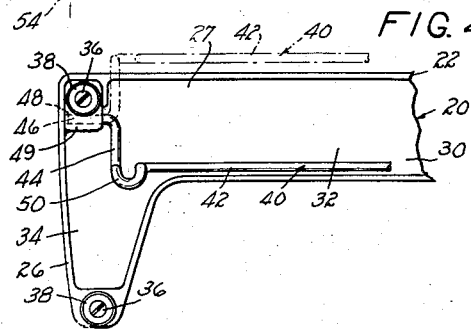
Figure 4 is a bottom view of a portion of the structure shown in Figure 1.

In accordance with the invention, the pedestal is provided with retractable stop means for engaging the side edge of a counter or table top on which it is placed when in use to prevent sliding of the food chopper in the direction of the shaft 8, the increased stability thus afforded making it unnecessary to clamp or otherwise affix the chopper in place during its operation. The stop means includes a crossbar 40 extending parallel to a long side of the base and having an elongate transversely disposed intermediate portion 42 formed at each end with arms 44 and 44a bent at right angles thereto. The arms 44 and 44a are in turn transversely bent at their ends as at 46 for journaling in transversely aligned slots such as 48 in legs 26, and are retained in the slots by plates or washers 49 secured by the screws 36. Thus the crossbar is hingedly or pivotally supported in the base for swinging movement about a transverse axis. By this arrangement the crossbar 40 is adapted to be moved from an extreme rearward position, in which it is spaced above the table or counter top as shown in dotted lines in Figure 3, and wholly enclosed within the recess 30 in the base, to an extreme forward position slightly below and in front of the pedestal. Slots 48 are preferably the proper depth so that plates 49 frictionally engage the ends 46 of the arms and thus retain the crossbar in any position to which it is moved.

The crossbar is formed with a pair of coplanar transversely spaced bights or loops forming lugs 50, 52. The lugs 50, 52 are so disposed as to be received within the end portions 34 of recess 30 in the rearward position of the crossbar, while in the forward position of the crossbar the lugs are disposed in a plane normal to the plane of the bottoms of the feet 38. Hence, in the forward position of the crossbar, the lugs 50, 52 are arranged to provide lateral faces to engage the side edge 54 of the table or counter top on which the chopper is placed. In this position the arms 44 and 44a engage the bottom edge of base 22 at points 56 intermediate their length, and this engagement provides a stop which prevents further movement of the arms in this direction. This insures firm support for the lugs during their engagement with the side edge of the counter or table top. The lugs thus effectively prevent sliding movement of the pedestal in a longitudinal direction and insure that the chopper will remain in proper position during its operation.

With this arrangement, the chopper can be quickly and easily placed in operation merely by swinging the crossbar out to its forward position and setting the pedestal on a table, counter, or other work surface adjacent its edge with the lugs 50, 52 engaging the side edge. The transversely extending lip portion 6 of the hopper provides a convenient handhold which the operator may grasp to press the chopper down and somewhat inwardly relative to the work surface while turning the crank 12. Longitudinal movement of the chopper relative to the work surface is prevented by the engagement of lugs 50, 52 with its side edge 54, and thus the operator can press down firmly on the handhold without fear of the chopper slipping away. Stability against rotation about a transverse axis is afforded by the elongate legs 26, while tipping of the pedestal about a longitudinal axis is of course prevented by the substantial length of the base 22. The off-center position of neck 24 increases the length of that portion of the base beneath the handhold, thus further increasing the stability of the pedestal and providing ample resistance against tipping, even though substantial downward force may be exerted on the handhold.

Thus it may be seen that the present invention provides a food chopper in which the necessity for a clamp or other special fastening means is completely eliminated, and secure and effective positioning of the chopper, even though grasped by only one hand of the operator, is insured. Moreover, when the chopper is put away, or if for any reason it may be desired to place it on a flat surface without engaging the edge thereof, the crossbar 40 can be conveniently folded to its rearward position in which it is spaced above and out of interfering relation with any surface on which the pedestal might be placed, and is enclosed out of sight within recess 30.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A support for a food chopper of the type wherein the chopper has a manually rotatable crank for the operation thereof comprising an elongated base member longitudinally extending at right angles to the axis of the crank, retractable stop means pivotally mounted adjacent a long side of said base member for movement about an axis parallel with said long side between a first position beneath the base member and a second position depending downwardly from said base member spaced outwardly from said long side, said stop means having a surface which extends normal to the bottom of said base member and faces inwardly of said base member when the stop means is in said second position for engagement with the edge of a table and the like.

2. A support for a food chopper of the type wherein the chopper has a manually rotatable crank for the operation thereof comprising an elongated base member longitudinally extending at right angles to the axis of the crank, a recess in the bottom of said base member, stop means pivotally mounted on said base member adjacent a long side thereof for movement between a first position with the stop means received in said recess and a second position with the stop means depending downwardly from said long side and spaced outwardly of said long side, and spaced-apart faces on said stop means adjacent the ends of said long side and connected for movement together, said faces being disposed perpendicularly to the bottom of said base member when said stop means is in said second position.

3. A support for a food chopper of the type wherein the chopper has a manually rotatable crank for the operation thereof comprising an elongated base longitudinally extending at right angles to the axis of rotation of the crank and having a plurality of supporting feet, said base having a downwardly opening recess in the bottom thereof, and a crossbar extending parallel to a long side of said base and having offset crank arms at its opposite ends pivotally mounted on the base for movement of the bar between a first position beneath said base to a second position spaced outwardly of said long side, said crossbar having a pair of coplanar loops integral therewith and spaced apart longitudinally thereof, said loops extending upwardly into said recess in said first position of the crossbar and extending downwardly at right angles to said base in said second position of the crossbar.

References Cited in the file of this patent

UNITED STATES PATENTS

| | | |
|---|---|---|
| 831,629 | Rollman | Sept. 25, 1906 |
| 1,840,400 | Lebherz | Jan. 12, 1932 |
| 2,382,811 | Papkin | Aug. 14, 1945 |
| 2,398,931 | Gegauf | Apr. 23, 1946 |

FOREIGN PATENTS

| | | |
|---|---|---|
| 683,052 | Great Britain | Nov. 19, 1952 |